United States Patent Office 3,514,552
Patented May 26, 1970

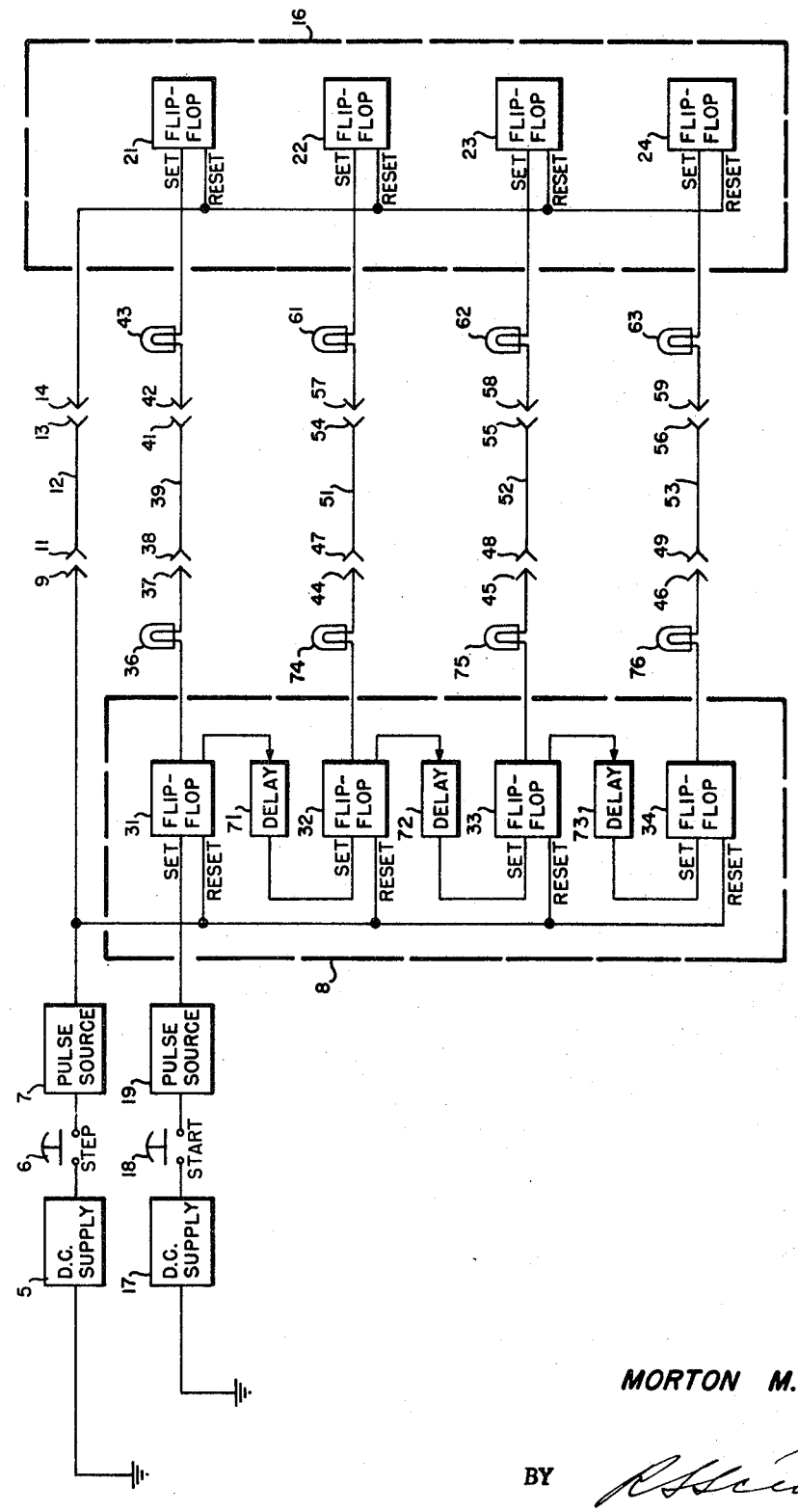

3,514,552
APPARATUS FOR CHECKING THE CONNECTION OF WIRES
Morton M. Smith, Alexandria, Va., assignor to the United States of America as represented by the Secretary of the Navy
Filed June 28, 1967, Ser. No. 650,169
Int. Cl. H04m 3/22
U.S. Cl. 179—175.25                10 Claims

ABSTRACT OF THE DISCLOSURE

Apparatus for checking the connection of wires between points having two multi-bit, flip-flop registers with corresponding status-indicator lights coupled thereto so that when the registers are coupled to the opposite ends of lines to be tested a pulse or bit can be stepped through one register and its flip-flops so that the corresponding flip-flops in the other register will also be set if the wiring between the registers is correct; and respective status-indicator lights will be lighted in sequence.

The invention described herein may be manufactured and used by or for the Government of the United States of America for governmental purposes without the payment of any royalties thereon or therefor.

BACKGROUND OF THE INVENTION

The present invention relates to a system for checking the connection of wires between points, and more particularly to a system which utilizes multi-bit, flip-flop registers and associated indicator lights to rapidly indicate whether or not the wiring between the points is correct and in the desired condition.

In the field of line and wire testing it has been the general practice to employ buzzers, lights or ohmmeters to run point-by-point continuity checks of electrical lines in order to see that they are properly wired. Although such devices and methods have served the purpose they have not proved entirely satisfactory under all conditions of service for the reasons that such manual point-by-point checking has involved a great deal of voice communications between the operators. In addition, the previous methods of checkout which consisted of the individual checking of each wire was very time consuming.

SUMMARY OF THE INVENTION

The general purpose of this invention is to provide a line testing apparatus which embraces all the advantages of similarly employed devices and methods but which possesses none of the aforedescribed disadvantages. To attain this the present invention contemplates a unique multi-bit, flip-flop register arrangement wherein one serial and one parallel register are used in conjunction with a plurality of indicator lights so that the connections of wires between points can be determined without the need for extensive voice communications between the operators and in much less time than has previously been required to accomplish the same objective.

An object of the present invention is the provision of apparatus for checking the connections of wires between points with a minimum of voice communications being necessary between the operators.

Another object is to provide such apparatus which can effectively accomplish the same purpose as is accomplished by prior art devices but which can do so with a great saving of time.

A further object of the invention is the provision of a line testing device that can readily identify which wires are connected to what points.

Still another object is to provide a device for testing the connections of a large number of wires between points, such as telephone lines.

Other objects and features of the invention will become apparent to those skilled in the art as the disclosure is made in the following description of a preferred embodiment of the invention as illustrated in the accompanying drawing.

BRIEF DESCRIPTION OF THE DRAWING

The figure illustrates a block diagram of a preferred embodiment of the invention.

DESCRIPTION OF THE PREFERRED EMBODIMENT

Referring now to the drawing, there is shown a DC supply 5 coupled through a step switch 6 to a pulse source 7 which could be, for example, a monostable multivibrator. This pulse source 7 is, in turn, coupled to a serial flip-flop register 8 and to a probe or connector 9, which is adapted to contact or connect with another connector 11 that is coupled to a line or wire 12. The opposite end of the line 12 is shown coupled to a connector 13, and a probe or connector 14 is shown which is adapted to couple to the connector 13. This probe or connector 14 is coupled to parallel flip-flop register 16, which includes a plurality of flip-flops, four of which are represented as flip-flops 21–24.

In addition, a second DC supply 17 is coupled through a start switch 18 to a pulse source 19, which may be, for example, a monostable multivibrator. The output of the pulse source 19 is then coupled to the set input of flip-flop 31 of serial register 8. The set output of flip-flop 31 is coupled to indicator light 36, which in turn is coupled to probe or connector 37. This probe or connector is adapted to be coupled to a connector 38 which is connected to one end of a line 39 to be tested. The other end of the line 39 is coupled to a connector 41, which is adapted to be coupled to probe or connector 42. This probe or connector 42, in turn, is connected to indicator light 43 which is connected to the set input of flip-flop 21.

The pulse source 7, in addition to being coupled to the probe or connector 9, is also coupled to the reset inputs of flip-flops 31 through 34. The reset outputs of flip-flops 31–33 are coupled through delays 71–73 to the set inputs of the next succeeding flip-flops 32, 33 and 34, respectively. Each of the set outputs of flip-flops 32–34 is coupled to indicator lights 74–76, respectively, which in turn are connected to probes or connectors 44–46, respectively. Each of these probes or connectors 44–46, in turn, is adapted to be coupled to connectors 47–49, respectively; and these connectors are coupled to lines 51–53, which are to be tested. The opposite ends of these lines 51–53 are connected to connectors 54–56, respectively. Each of these connectors is adapted, as is connector 41 wth respect to probe 42, to be coupled to probes or connectors 57–59. In turn, each of the probes 57–59 is coupled to a respective indicator light 61–63; and each of the indicator lights is connected to the set input of its respective flip-flop 22–24 of parallel register 16.

In the operation of the apparatus of this invention in which it is desired to determine the connections of lines 39, 51, 52 and 53 and wherein it is to be determined if any of these lines are shorted or open circuits, the step switch 6 is depressed a sufficient number of times to reset each of the flip-flops 21–24 and 31–34. For example, the step switch 6 must be depressed a number of times corresponding to the number of flip-flops included in one register. In accordance with the embodiment illustrated in the figure this would require the depressing of the step switch 6 four times since there are four flip-flops represented as being present in each of the registers 8 and 16. Because the pulse source 7, which may be a monostable multivibrator, will produce only one uniform pulse for each depression of the step switch 6 and will do so independently of the duration of the depression of the switch 6, the switch when depressed will enable the DC supply 5 to energize the pulse source 7 so that such a uniform pulse is produced. This pulse instantly resets flip-flops 21 and 31.

The step switch 6 must then be released and depressed a second time so that a second uniform pulse is emitted from the pulse source 7. Because the flip-flops 21 and 31 are already reset, this pulse has no effect on them; however, the resetting of flip-flops 21 and 31 by the initial pulse from pulse source 7 may have set flip-flops 22 and 32, respectively, if flip-flops 21 and 31 were initially in a set condition prior to the initial pulse from pulse source 7. Under these circumstances the second pulse from the pulse source 7 will then act to reset flip-flops 22 and 32. In the event that these flip-flops 22 and 32 were already in a reset condition at the time when the second pulse from pulse source 7 was generated, the flip-flops 22 and 32 will merely remain in this reset condition. This process is then repeated with respect to flip-flops 23, 33, 24 and 34 by depressing the step switch 6 a total of four times. In this way each of the flip-flops in both registers 8 and 16 are initially in a reset condition. Of course it should be understood that four flip-flops have been shown in each register merely for the sake of explanation and that any number of flip-flops may be included in each of the registers depending upon the function to be performed and the number of lines or wires to be tested.

At this point in the operation of the device with the step switch now in an open condition, the start switch 18 is depressed so that a uniform pulse is generated at the output of pulse source 19. This pulse is fed directly into the set input of flip-flop 31 so that this flip-flop is in a set condition. As a result, a constant signal output is generated at the set output of flip-flop 31 so as to illuminate indicator light 36 as it also passes through connectors 37 and 38, through line 39, connectors 41 and 42, through indicator light 43 to the set input of flip-flop 21. At this point, it can be seen that if the line 39 to be tested is correctly connected and if it is not short circuited to other wires and if it is not an open circuit, the operators at both ends of the line 39 will see their respective indicator lights 36 and 43 illuminated. If the line is short circuited to another wire or wires, the corresponding flip-flops in register 16 will be set and their indicator lights illuminated, thus indicating this condition and also whch lines are in error.

After the condition of the line 39 has been determined and the start switch 18 has been released so as to be in an open condition, the step switch 6 can again be depressed in order to enable the pulse source 7 to generate a uniform pulse at its output. This pulse acts to reset the flip-flops 21 and 31 so that no output signal is present from the set output of flip-flop 31. As a result, the indicator lights 36 and 43 are no longer illuminated; and because of the pulse from pulse source 7 to the reset input of flip-flop 31, the reset output signal of flip-flop 31 abruptly changes from zero to a constant nonzero value. This abrupt change in the reset output of flip-flop 31 is coupled through the delay 71 to the set input of flip-flop 32. Because of this delay, this signal charge from the reset output of flip-flop 31 to the set input of flip-flop 32 reaches the set input of flip-flop 32 after the pulse from pulse source 7 to the reset input of flip-flop 32 has gone to zero. Thus, the flip-flop 32 is placed in a set condition, and a constant value signal is present at the set output of ip-flop 32, which signal passes through indicator light 74, connectors 44 and 47, line 51, connectors 54 and 57, indicator light 61, and finally to the set input of flip-flop 22. Thus, if the line 51 is connected properly and is not an open circuit, the indicator lights 74 and 61 will be illuminated to indicate to the operators at both ends of the line 51 that the condition of the line 51 is as desired. If line 51 is short circuited to any other line or lines, the corresponding flip-flops in register 16 will be set and the indicator lights will be illuminated.

This procedure is then repeated by depressing the step switch 6 so that another pulse is generated at the output of pulse source 7. This pulse is present at each of the reset inputs of the flip-flops 31–34. As a result, the pulse changes flip-flop 32 from a set to a reset condition and a constant value signal is generated at the reset output of flip-flop 32. This change in the reset output of flip-flop 32 is transmitted through the delay 72 to the set input of flip-flop 33. Again, because of the delay this signal which passes through the delay 72 reaches the set input of flip-flop 33 at a time after the pulse from pulse source 7 has ceased to exist at the reset input of flip-flop 33 so that the flip-flop 33 is placed in a set condition. If the line 52 is correctly connected the indicator lights 75 and 62 will be illuminated to indicate this condition. Because it is the change in the signal at the set input to the flip-flops which places them in a set condition the second pulse generated from pulse source 7, although it sets flip-flop 33, does not set flip-flop 32. This is because flip-flop 31 was already in a reset condition so that a constant value signal was already present at the reset output of flip-flop 31. Thus, because it is only the change in the signal, e.g. at the reset output of flip-flop output 31 which passes through delay 71 that sets flip-flop 32, where there is no change in the reset output of flip-flop 31 the flip-flop 32 is not placed in a set condition. However, because the reset output of flip-flop 32 changd from zero to a constant value signal upon the application of a pulse to the reset input of flip-flop 32, this change was transmitted thruogh delay 72 to the set input of flip-flop 33 so as to place flip-flop 33 in a set condition. This procedure is again repeated by the depression of step switch 6 so that the indicator lights 76 and 63 will be illuminated if the line 53 to be tested is correctly connected and is not an open circuit or a short circuit.

Thus it can be seen that this invention provides for an effective and time-saving device for checking the connection of wires between points so as to identify what wires are connected to what points and so as to determine whether short circuits or open circuits are present. It can also be seen that by the use of this invention it not only can be determined whether or not the lines to be tested are connected in the correct sequence, but it can also be determined if the lines are not connected in the correct sequence in what sequence they are actually connected by observing the sequence of illumination of the indicator lights in register 16. In addition, any short circuits between wires, e.g. due to faulty insulation, will be readily apparent at register 16. This new apparatus will save many man-hours previously spent in the point-by-point check-out of wiring and has obvious application to the testing of telephone lines, power lines and in any environment wherein it is necessary to determine swiftly and accurately the connections of a plurality of wires or lines.

It should be understood, of course, that the foregoing disclosure relates only to a preferred embodiment of the invention and that numerous modifications or alterations may be made therein without departing from the spirit and the scope of the invention as set forth in the appended claims.

What is claimed and desired to be secured by letters patent of the United States is:

1. Apparatus for checking the connection of a plurality of wires comprising:
    at least one serial flip-flop register having a plurality of outputs adapted to be simultaneously electrically coupled to first ends of said plurality of wires;

at least one parallel flip-flop register having a plurality of inputs adapted to be simultaneously electrically coupled to second ends of said plurality of wires;

first means electrically coupled to said serial register and adapted to be electrically coupled to said parallel register for selectively supplying electrical pulses to said registers;

second means electrically coupled to said serial register for selectively supplying electrical pulses thereto; and means coupled to said serial and to said parallel register for indicating the condition of said plurality of wires.

2. The apparatus of claim 1 wherein said serial register includes:

a plurality of flip-flops; and a plurality of delays electrically coupled, one each between adjacent ones of said flip-flops.

3. The apparatus of claim 2 wherein each one of said delays is electrically coupled between a reset output of one of said flip-flops and a set input of another of said flip-flops.

4. The apparatus of claim 2 wherein said parallel register includes:

a plurality of flip-flops the reset inputs of which are adapted to be electrically coupled to said first means.

5. The apparatus of claim 4 wherein said second means is electrically coupled to the set input of a first one of said flip-flops of said serial register.

6. The apparatus of claim 5 wherein said first means is electrically coupled to the reset inputs of the flip-flops of said serial register.

7. The apparatus of claim 6 wherein said second means includes:

a DC supply;

a pulse source; and a start switch electrically coupled between said DC supply and said pulse source.

8. The apparatus of claim 6 wherein said first means includes:

a first DC supply;

a first pulse source; and a step switch electrically coupled between said DC supply and said first pulse source.

9. The apparatus of claim 8 wherein said second means includes:

a second DC supply;

a second pulse source; and a start switch electrically coupled between said second DC supply and said second pulse source.

10. The apparatus of claim 9 wherein said indicating means includes indicator lamps.

References Cited

UNITED STATES PATENTS 3,219,845 11/1965 Nieh _____ 307—221
3,288,943 11/1966 Bohnenblust _____ 179—175.3

KATHLEEN H. CLAFFY, Primary Examiner

A. B. KIMBALL, Jr., Assistant Examiner

U.S. Cl. X.R.

324—66